(12) United States Patent
Liu et al.

(10) Patent No.: US 11,549,660 B2
(45) Date of Patent: Jan. 10, 2023

(54) PROJECTION STRUCTURE, PROJECTION METHOD, AND CORRESPONDING VEHICLE LAMP AND VEHICLE

(71) Applicant: VALEO VISION, Bobigny (FR)

(72) Inventors: Lixian Liu, Wuhan (CN); Jiehong Long, Wuhan (CN)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 17/413,231

(22) PCT Filed: Dec. 13, 2019

(86) PCT No.: PCT/CN2019/125015
§ 371 (c)(1),
(2) Date: Jun. 11, 2021

(87) PCT Pub. No.: WO2020/119775
PCT Pub. Date: Jun. 18, 2020

(65) Prior Publication Data
US 2022/0018515 A1 Jan. 20, 2022

(30) Foreign Application Priority Data
Dec. 13, 2018 (CN) .......................... 201811523399.6

(51) Int. Cl.
*F21S 41/63* (2018.01)
*F21V 5/00* (2018.01)
(Continued)

(52) U.S. Cl.
CPC ............ *F21V 5/008* (2013.01); *F21S 41/635* (2018.01); *F21V 14/08* (2013.01); *G03B 21/43* (2013.01)

(58) Field of Classification Search
CPC . F21S 41/635; F21S 41/25–275; F21V 14/06; F21V 14/08
See application file for complete search history.

(56) References Cited

U.S. PATENT DOCUMENTS 10,302,922 B2   5/2019  McClelland et al.
2014/0204347 A1 7/2014  Murphy
(Continued)

FOREIGN PATENT DOCUMENTS

CN   102767782 A   11/2012
CN   103591541 A   2/2014
(Continued)

OTHER PUBLICATIONS

International Search Report dated Mar. 17, 2020 in PCT/CN2019/125015 filed Dec. 13, 2019.

*Primary Examiner* — Sean P Gramling
(74) *Attorney, Agent, or Firm* — Oblon, McClelland, Maier & Neustadt, L.L.P.

(57) ABSTRACT

A projection structure that occupies a small space and performs dynamic projection includes a first support, a lens assembly, a film portion, a light source, a motor, a control portion, and a second support, wherein the light source, the film portion, and the lens assembly form a projection light path, the film portion being driven by the motor to rotate. The lens assembly includes at least one lens, and the at least one lens is accommodated in the first support, the control portion being configured to control the motor and/or the light source. The second support is configured to support the first support, wherein the first support and second support are respectively configured to form a first space and a second space of the film portion.

20 Claims, 9 Drawing Sheets

(51) Int. Cl.
*G03B 21/43* (2006.01)
*F21V 14/08* (2006.01)

(56) References Cited

U.S. PATENT DOCUMENTS

2017/0009948 A1\* 1/2017 Yagi ..................... F21S 45/435
2017/0158120 A1\* 6/2017 McClelland ............ F21V 14/00

FOREIGN PATENT DOCUMENTS

| CN | 106838760 A | 6/2017 |
| CN | 108253345 A | 7/2018 |

\* cited by examiner

PROJECTION STRUCTURE, PROJECTION METHOD, AND CORRESPONDING VEHICLE LAMP AND VEHICLE

TECHNICAL FIELD

The present invention relates to the field of projection technology, in particular to a projection structure, a projection method, and a corresponding vehicle lamp and vehicle.

BACKGROUND ART

Many conventional professional projection devices have large structures, occupying large spaces, while universally available projection devices usually can project static patterns only but cannot provide any dynamic pattern information. Moreover, dynamic information generated by a conventional projection method is often obscure and delivers a poor visual effect.

SUMMARY OF THE INVENTION

In view of the above-mentioned situation, a problem to be solved by an embodiment of the present invention is how to provide a projection structure that occupies a small space and allows dynamic projection.

In an aspect according to the present invention, a projection structure is provided, comprising:

a first support, a lens assembly, a film portion, a light source, a motor, a control portion, and a second support, wherein said light source, said film portion, and said lens assembly form a projection light path, said film portion being driven by said motor to rotate; said lens assembly comprises at least one lens, and said at least one lens is accommodated in said first support, said control portion being configured to control said motor and/or said light source; said second support is configured to support said first support, wherein said first support and second support respectively form a first space and a second space for accommodating said film portion.

Those of ordinary skill in the art may understand that a projection structure according to the present invention is more compact and suitable for installation in a variety of application scenarios.

A projection structure according to the present invention is provided, wherein said projection structure further comprises a transmission mechanism, wherein said film portion, via said transmission mechanism, is driven by said motor to rotate; said second support is configured to support said transmission mechanism and said first support.

An appropriate transmission mechanism may be adopted and positioned between a first support and a second support to better save space.

A projection structure according to the present invention is provided, wherein said first support further comprises an optical channel and an accommodating portion for accommodating said optical channel, said optical channel being configured to collimate a light beam from said light source as a collimated light beam and cause said collimated light beam to penetrate said film portion.

Use of an optical channel allows effective calibration of a light beam from a light source and makes the overall projection structure compacter.

A projection structure according to the present invention is provided, wherein said lens assembly comprises at least one rear lens, said at least one rear lens being positioned between said film portion and a projection output port.

Use of a plurality of lenses allows better processing of light beams from a light source to meet projection needs.

A projection structure according to the present invention is provided, wherein said lens assembly comprises at least one front lens and at least one rear lens, said front lens being positioned between said light source and said film portion, said at least one rear lens being positioned between said film portion and a projection output port.

Use of a front lens and a rear lens allows regulation of light beams to obtain light beams suitable for projection. Further, use of a plurality of front lenses allows more accurate and complex regulation of light beams travelling the distance from a light source to the film.

A projection structure according to the present invention is provided, wherein said first support comprises:

a lower support and an upper support, wherein said lower support comprises a lower lens groove that corresponds to said lens assembly, said upper support comprises an upper lens groove that corresponds to said lens assembly, and said lower lens groove and upper lens groove may match each other to fix a lens position.

Arrangement of a lens groove on the upper and lower supports respectively allows a lens assembly to be installed more conveniently and better fixed in the projection structure.

A projection structure according to the present invention is provided, wherein a step motor is used as said motor.

Use of a step motor allows better synchronization between the motor and a light source to achieve a better projection effect.

A projection structure according to the present invention is provided, wherein a stepping angle of said motor corresponds to the number of films used in the film portion.

Setting a stepping angle that corresponds to the number of films used ensures that a rotation distance between two films is an integral number of steps, allowing convenient control.

A projection structure according to the present invention is provided, wherein said control portion is configured to receive input information, thereby triggering a corresponding control signal, and output said control signal to said motor and/or light source.

Controlling, by the control portion, the motor and light source allows production of more diverse projection effects and improvement of projection quality.

A projection structure according to the present invention is provided, wherein said control portion may obtain at least one of the following pieces of information:

Film position information;

Vehicle speed information; and

Vehicle operation information.

Input information from a variety of sources is obtained to determine their corresponding control signals respectively; thus, more diverse projection effects may be produced to respond to needs in more scenarios.

A projection structure according to the present invention is provided, wherein said control portion may obtain sensing input information from an infrared sensor, said infrared sensor being configured to detect one or more specific positions on said film portion.

Detection of a specific position on the film portion allows convenient calibration of a start position of the projection structure, thereby producing a better projection effect.

In an aspect of the present invention, a method for controlling projection is further provided, wherein said projection structure is adopted in said method, said method comprising:

controlling, by said control portion, said motor and said light source such that said motor is in a stop state when said light source emits a light beam.

Said motor and said light source are controlled by said control portion such that said motor is in a stop state when projection is performed, thereby improving the imaging quality of the projection.

A method according to the present invention is provided, wherein said method further comprises:

controlling the number of rotations of said motor within one cycle, the number of steps per rotation, and the time interval between two rotations; and keeping said light source lit within said time interval and turning off said light source before said motor rotates.

Controlling a motor and a light source respectively by directly outputting a cycle of control pulse allows better cooperation between the two.

A method according to the present invention is provided, wherein said method further comprises the following step:

calibrating a position of said motor based on a detected start position of said film portion.

A rotational position of the motor is calibrated by a start position of the film portion to improve its imaging quality.

A method according to the present invention is provided, wherein said method further comprises the following step:

regulating the rotation cycle of said motor based on a travelling speed of the vehicle on which said projection structure is mounted.

The above-described regulation causes a projected image to match a traveling speed of the vehicle, thereby improving its visual effect, and, at the same time, allows acquisition of alert information about another vehicle.

A method according to the present invention is provided, wherein said method further comprises the following step:

triggering operation of said projection structure when opening of a door of the vehicle corresponding to said projection structure is detected.

By such a triggering operation, when it is applied on a vehicle door structure, performance of a door-opening operation may be effectively indicated to people around the vehicle.

In another aspect according to the present invention, a vehicle lamp is further provided, comprising said projection structure.

In yet another aspect according to the present invention, a vehicle is further provided, comprising said vehicle lamp.

Compared with the prior art, the present invention has the following advantages: The projection structure, while remaining compact, may still provide dynamic images. The respective durations of operation of the light source and motor are controlled such that a film is projected only when it is in a stop state; thus, image obscurity due to film rotation is prevented, and higher projection quality is achieved. In addition, the control portion may have a variety of inputs and, based on different inputs, output the corresponding control signals; thus, the projection structure is capable of giving feedback on a variety of circumstances, and is applicable in more scenarios.

BRIEF DESCRIPTION OF THE DRAWINGS

Other characteristics, objectives, and advantages of the present invention will be made more apparent by reading detailed descriptions of non-limiting embodiments with reference to the following figures.

Figure 1:
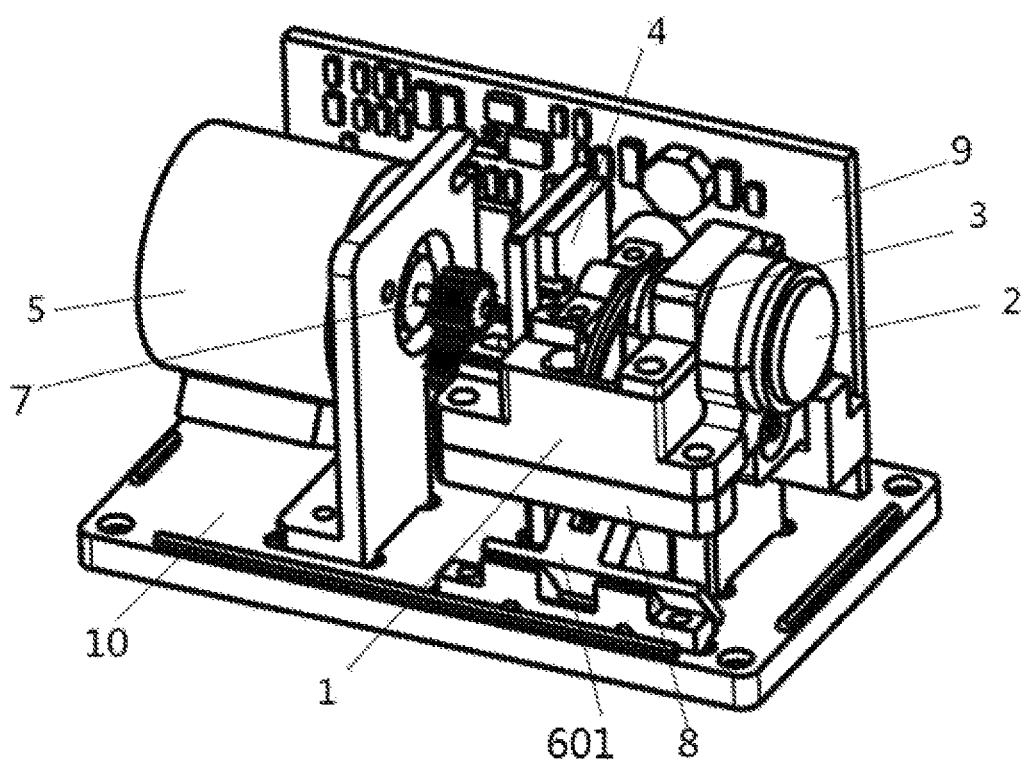
FIG. 1 shows a stereoscopic schematic diagram of a projection structure according to an embodiment of the present invention.

| List of reference numerals: | | | |
|---|---|---|---|
| 1 | First support | 2 | Lens assembly |
| 3 | Film portion | 4 | Light source |
| 5 | Motor | 6 | Control portion |
| 7 | Transmission mechanism | 8 | Second support |
| 9 | PCB | 10 | Support plate |
| 100a | Lower support | 100b | Upper support |
| 101a | Lower lens groove | 101b | Upper lens groove |
| 102a | Accommodating portion | 102b | Optical channel |
| 103 | First space | 2a | Front lens |
| 2b | Rear lens | 601 | Infrared sensor |
| 801 | Second space | 802 | Transmission accommodating portion |

SPECIFIC EMBODIMENTS

Preferred embodiments of the present invention will be described in greater detail below with reference to the drawings. Although preferred embodiments of the present invention are shown in the drawings, it should be understood that the present invention may be implemented in various forms, instead of being limited by the embodiments described herein. These embodiments are provided to allow a more thorough and complete understanding of the present invention, and completely convey the scope of the present invention to those of ordinary skill in the art.

An embodiment according to the present invention discloses a projection structure and a method for projection, as well as a vehicle lamp that has said projection structure and a vehicle that adopts said vehicle lamp.

See FIG. 1. FIG. 1 shows a stereoscopic schematic diagram of a projection structure according to an embodiment of the present invention.

A projection structure of the embodiment shown in FIG. 1 comprises a first support 1, a lens assembly 2, a film portion 3, a light source 4, a motor 5, a control portion 6, and a second support 8, wherein the light source 4, the film portion 3, and the lens assembly 2 form a projection light path.

The film portion 3 is driven by the motor 5 to rotate; said lens assembly 2 comprises at least one lens, and said at least one lens is accommodated in said first support 1, said control portion 6 being configured to control said motor 5 and/or said light source 4; said second support 8 is configured to support said first support 1, wherein said first support 1 and second support 8 respectively have a first space 103 and a second space 801 for accommodating said film portion 3, wherein the first space 103 and the second space 801 may be combined to accommodate rotation of said film portion therein.

The first space 103 is a gap that has a length at least larger than the diameter of the film portion 3, so that the film portion 3 is rotatable therein, wherein the first support 1 is divisible into two parts by the first space 103, or may remain integral by disposing a rigid component on a side of the first space 103, wherein the control portion 6 may usually be implemented by a Micro Controller Unit (MCU); in addition, it may be physically separated by a certain distance from a part configured to receive input, for example, a sensor 601, wherein a projection structure according to the present invention may further comprise a variety of support components configured to support the light source 4, the motor 5, the control portion 6, and the sensor 601, respectively; their shapes may be determined on the basis of actual conditions and needs, and so no similar descriptions will be provided again.

A light source according to the present invention may be one of a variety of light-emitting components, preferably, an LED light source.

The first support 1 according to the present invention has a groove structure configured to fix each lens in said lens assembly 2 and a fixing structure configured to fix itself to the second support 8, wherein said groove structure may take one of a variety of forms. For example, said groove structure may take a form in which an upper hemisphere and a lower hemisphere are separable; the inner concave surfaces of the two hemispheres respectively have a plurality of recesses that match one another; said plurality of recesses fit the circumferential sizes and edge thicknesses of the lenses used, and the space intervals between said plurality of recesses may be determined on the basis of the thicknesses of and space intervals between the lenses, wherein a separable rigid connection is established between the second support 8 and the first support 1. For example, a connection may be established by a bolt, clutch matching, etc.

Therefore, those of ordinary skill in the art may understand that said fixing structure includes, but is not limited to, a structure that may separably and rigidly connect the first support 1 to the second support 8. For example, when a bolt connection mode is adopted, the first support 1 may be provided with a hole that corresponds to a bolt; in another example, when a connection mode by clutch matching is adopted, the first support 1 may be provided with a convex portion for fitting into a concave portion of the second support 8; or conversely, the first support 1 is provided with a concave portion for fitting with a convex portion of the second support 8; or the first support 1 may, at the same time, be provided with a convex portion and a concave portion that fit with the second support 8 to achieve a better clutching effect, etc.

For an embodiment according to the present invention, see FIGS. 2 to 6. FIGS. 2 to 6 show a projection structure according to the present invention. The first support 1 comprises an optical channel 102b and an accommodating portion 102a that is configured to accommodate said optical channel 102b. Said lens assembly 2 comprises at least one rear lens 2b, said at least one rear lens 2b being positioned between said film portion 3 and a projection output port, wherein said optical channel 102b is configured to collimate a light beam from said light source 4 as a collimated light beam and cause said collimated light beam to penetrate said film portion 3, wherein those of ordinary skill in the art may understand that said optical channel 102b may be a component integrated with said first support 1 or may be a standalone component.

Figure 2:
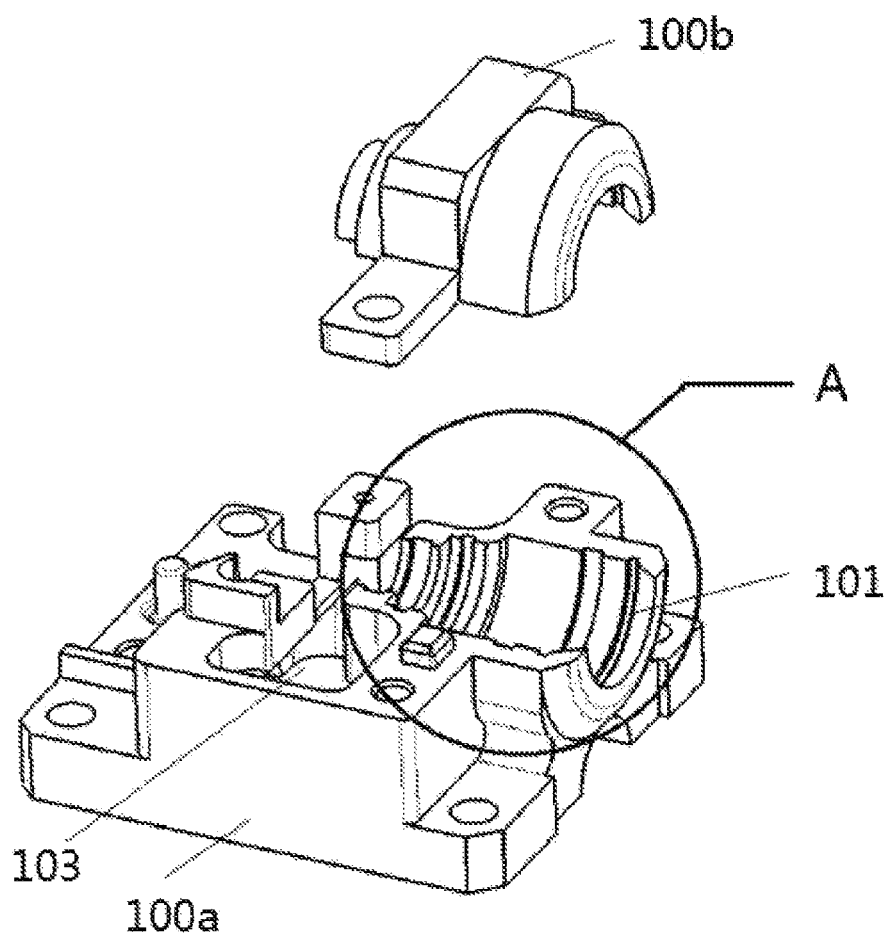
FIG. 2 shows a stereoscopic schematic diagram of a first support of a projection structure according to an embodiment of the present invention.

More specifically, see FIG. 2; FIG. 2 shows a structural diagram of the first support 1 according to an embodiment of the present invention.

The first support 1 according to the present embodiment comprises a lower support 100a and an upper support 100b, said lower support 100a comprising at least one lower lens groove 101a, said upper support 100b comprising at least one upper lens groove 101b that respectively corresponds to each lower lens groove 101a in said at least one lower lens groove 101a, wherein a separable rigid connection is established between the lower support 100a and the upper support 100b. For example, a connection may be established by a bolt, clutch matching, etc.

For specific implementation of said separable rigid connection mode, reference may be made to the above description of a rigid connection between the first support 1 and the second support 8, and so no similar descriptions will be provided again. Certainly, those of ordinary skill in the art may determine a mode of establishing a rigid connection between the lower support 100a and the upper support 100b based on actual conditions, without having to adopt the same connection mode as that adopted between the first support 1 and the second support 8.

Figure 3:
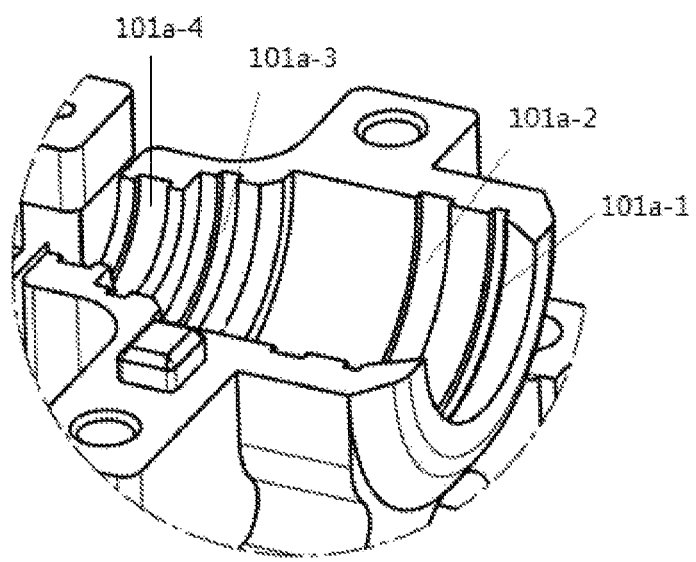
FIG. 3 shows an enlarged view of region A of the first support shown in FIG. 2.
Figure 4A:
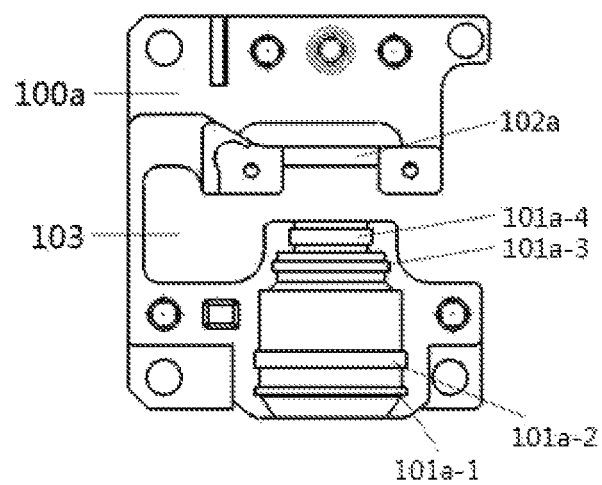
FIG. 4a shows a top view of a lower support of the first support shown in FIG. 2.
Figure 4B:
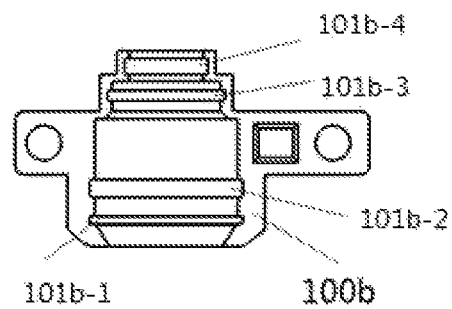
FIG. 4b shows a bottom view of an upper support of the first support shown in FIG. 2.

Preferably, see FIGS. 3, 4a, and 4b. FIG. 3 shows an enlarged view of region A of the first support shown in FIG. 2; FIG. 4a shows a top view of the lower support 100a of the first support shown in FIG. 2; FIG. 4b shows a bottom view of the upper support 100b of the first support shown in FIG. 2.

Figure 5:
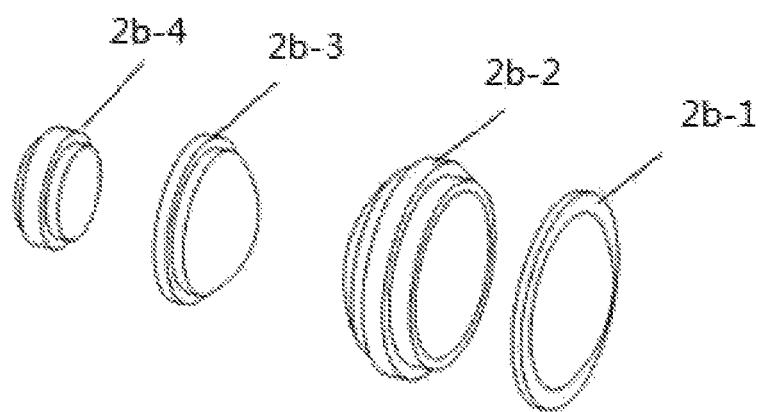
FIG. 5 shows a lens assembly that adopts four rear lenses according to an embodiment of the present invention.
Figure 6:
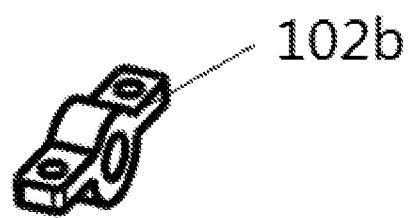
FIG. 6 shows a stereoscopic diagram of an optical channel according to an embodiment of the present invention.

The lens assembly 2 in a projection structure according to the present embodiment comprises four rear lenses. See FIG. 5; FIG. 5 schematically shows the four rear lenses 2b adopted in the embodiment: rear lenses 2b-1, 2b-2, 2b-3, and 2b-4, wherein the lower support 100a in the embodiment shown in FIG. 3 comprises four lower lens grooves 101a, which are numbered lower lens grooves 101a-1, 101a-2, 101a-3, and 101a-4. In conjunction with FIG. 4a, the distribution of each lower lens groove 101a may be further clarified.

Still referring to FIG. 4b, the upper support 100b comprises four upper lens grooves 101b (numbered upper lens grooves 101b-1, 101b-2, 101b-3, and 101b-4) that correspond to the lower lens grooves 101a, respectively, wherein when the lower lens grooves 101a and the upper lens grooves 101b are closed, a lens groove for fixing the rear lens 2b-1 may be formed; similarly, when the lower lens grooves 101a and the upper lens grooves 101b are closed, a lens groove for fixing a corresponding lens 2b may be formed respectively, wherein those of ordinary skill in the art may understand that the number of lenses needed and the corresponding number of lens grooves may be determined on the basis of actual conditions and requirements, instead of being limited to the above-described examples.

In the projection structure according to another embodiment of the present invention, said lens assembly 2 comprises at least one front lens 2a and at least one rear lens 2b. Said front lens is positioned between said light source 4 and said film portion 3, and said at least one rear lens 2b is positioned between said film portion 3 and a projection output port.

In a projection structure according to the embodiment, the first support 1 is provided with a lower accommodating groove 102a' and an upper accommodating groove 102b' for accommodating said at least one front lens 2a, wherein the lower accommodating groove 102a' may comprise at least one lower accommodating groove that respectively corresponds to each front lens in said at least one front lens 2a. Similarly, the upper accommodating groove 102b' may comprise at least one upper accommodating groove that respectively corresponds to each front lens in said at least one front lens 2a. Each upper accommodating groove may cooperate with a lower accommodating groove to form an accommodating groove for fixing a front lens.

For example, when two front lenses 2a-1 and 2a-2 are used, the lower accommodating groove 102a' consists of two accommodating grooves 102a'-1 and 102a'-2, and the upper accommodating groove 102b' consists of two accommodating grooves 102b'-1 and 102b'-2, wherein the lower accommodating groove 102a'-1 may cooperate with the upper accommodating groove 102b'-1 to form an accommodating groove for accommodating the front lens 2a-1; similarly, the lower accommodating groove 102a'-2 may cooperate with the upper accommodating groove 102b'-2 to form an accommodating groove for accommodating the front lens 2a-2.

Those of ordinary skill in the art may understand that the lower accommodating groove 102a' may be integrated with the lower support 100a or may be a standalone component that is independent and fixable on the lower support 100a. The upper accommodating groove 102b' may be integrated with the upper support 100b, and may also be a standalone component that is fixable on the lower support 100a or a standalone component that is fixable on the upper support 100b.

Figure 8:
FIG. 8 shows an infrared sensor structure according to an embodiment of the present invention.
Figure 9:
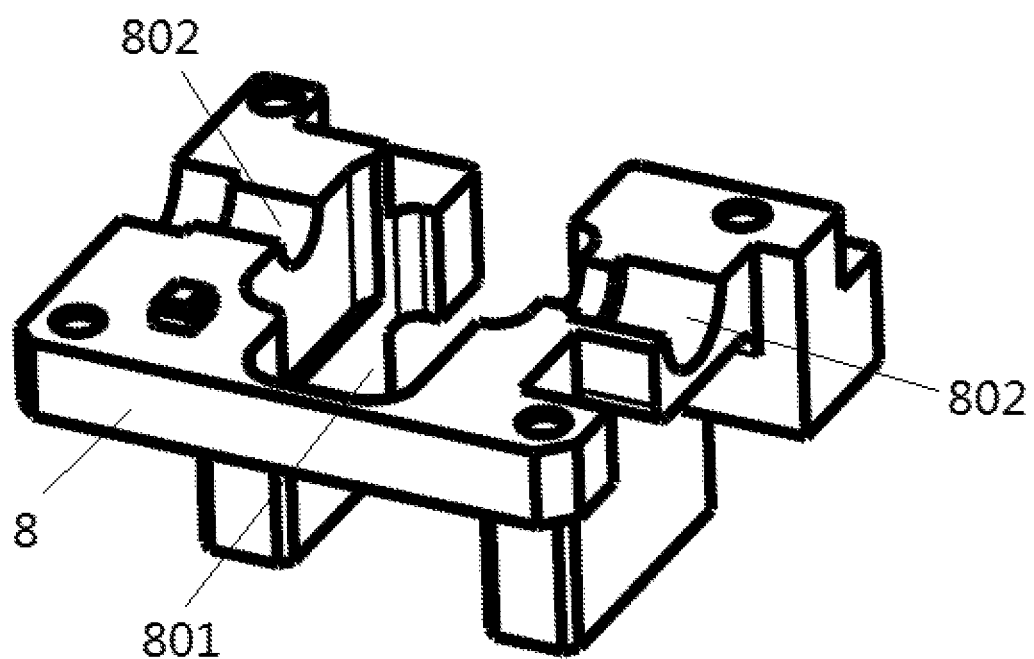
FIG. 9 shows a stereoscopic schematic diagram of a second support of a projection structure according to an embodiment of the present invention.

A projection structure of the present invention will be further explained with reference to FIGS. 7 to 9. According to the present embodiment, said projection structure further comprises a transmission mechanism 7. Said transmission mechanism 7 is configured to connect said motor 5 and film portion 3, causing said film portion 3 to, via said transmission mechanism 7, be driven by said motor 5 to rotate.

Figure 7:
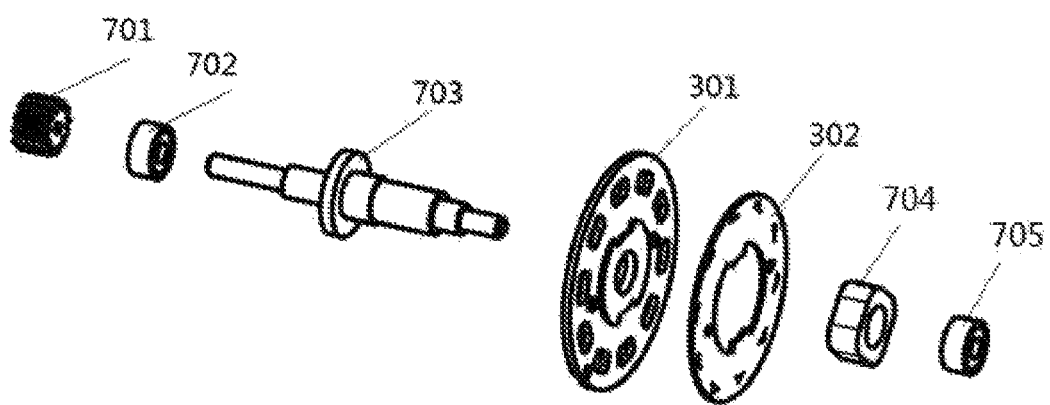
FIG. 7 shows an exploded view of a transmission mechanism and a film portion according to an embodiment of the present invention.

See FIG. 7; FIG. 7 shows an exploded view of the transmission mechanism 7 and the film portion 3 according to an embodiment of the present invention.

The transmission mechanism 7 as shown in FIG. 7 comprises: a gear wheel 701, an inner bearing 702, a transmission shaft 703, an outer nut 704, and an outer bearing 706, wherein the film portion 3 is installed between the transmission shaft 703 and the outer nut 704.

Those of ordinary skill in the art may understand that the above-described embodiments are only examples given to provide a clear explanation and that the transmission mechanism 7 may further comprise any other component needed for implementing transmission or optimizing a transmission effect, instead of being limited to the above-described embodiments.

The film portion 3 comprises a flywheel 301 and a film 302, wherein the flywheel 301 may be loaded with the film 302 and is provided with a hole through which a light beam may pass, so that a light beam from the light source 4 may pass through said hole and shine on a corresponding position of the film 302.

The transmission mechanism 7 is supported by the second support 8. In other words, the second support 8 supports the transmission mechanism 7 and the first support 1 at the same time, wherein, as shown in FIG. 9, the second support 8 comprises a transmission accommodating portion 802 for supporting the transmission mechanism 7.

Wherein the transmission accommodating portion 802 is an arched recess, the arch being configured to adapt to the circumference of each component of the transmission mechanism 7. The arched recess is disposed on a surface of the second support 8, extending from the motor in the direction of the projection output port. Those of ordinary skill in the art may understand that said arched recess is discontinuous, and its middle part is interrupted by a second space 803.

The second space 803 is a gap that has a length at least larger than the diameter of the film portion 3, so that the film portion 3 is rotatable therein.

Similar to the first support 1, the second support is divisible into two parts by the second space 801, or may remain integral by disposing a rigid component on a side of the second space 801.

In an embodiment of the present invention, a step motor is used as said motor 5. Preferably, a stepping angle of said step motor used corresponds to the number of films used in the film portion 3.

For example, a stepping angle is set to a value divisible by an angular distance between the films.

In yet another embodiment according to the present invention, the control portion 6 according to said embodiment is configured to receive input information for triggering a corresponding control signal, and to output said control signal to said motor 5 and/or the light source 4.

Wherein the control portion 6 obtains input information by a detection device, for example, a sensor.

Preferably, input information obtained by the control portion 6 includes, but is not limited to, at least one of the following items:

1) Film position information, for example, start position information about each film, position information about each film, etc.;

2) Vehicle speed information, for example, information about current vehicle speed, information about vehicle speed class, etc.;

3) Vehicle operation information, for example, a braking operation, a door-opening operation, etc.

Preferably, the control portion 6, based on input information, determines whether to trigger starting or stopping of the projection structure; alternatively, the control portion 6, based on input information, controls the running time, running interval, etc. of the projection structure.

For example, when the control portion 6 detects information about a door-opening operation via a sensor, the control portion 6 outputs trigger information to trigger starting of the projection structure; in another example, a vehicle speed is divided into one of three classes: fast, medium, and slow; a motor rotation cycle is accordingly divided into one of three classes: short, medium, and long; when a vehicle is travelling, if the control portion 6 obtains information about the current speed class as "fast", then the control portion 6, based on the input information, determines that the corresponding motor rotation cycle class is "short" and outputs to the motor a control signal for the shortest cycle, so that the motor rotates in the shortest cycle; in other words, animated motions performed by projection become the fastest.

In a preferred solution according to the present embodiment, the control portion 6 may obtain sensing input information from an infrared sensor 601, wherein the infrared sensor 601 is configured to detect one or more specific positions on said film portion 3. See FIG. 8; FIG. 8 shows the structure of an infrared sensor, of which the front portion is provided with two protrusive arms; when the flywheel rotates between the two arms, specific structures of the flywheel, such as dents and bulges on a flywheel surface, may be detected.

In an embodiment according to the present preferred solution, the flywheel of the film portion 3 is provided with a dent for marking a start point; when the infrared sensor 601 detects the dent, the control portion 6 triggers a motor control signal so that the motor drives the flywheel to stop in that position, and then sends a periodic control signal to the motor so that the motor drives the flywheel to rotate by a required angle.

In another embodiment according to the present preferred solution, a positioning structure is provided before each film position on the flywheel of the film portion 3; when the infrared sensor 601 detects said positioning structure, the control portion 6 sends a signal to the motor, causing it to stop in that position.

Those of ordinary skill in the art may understand that a variety of sensors, instead of being limited to an infrared sensor, may be used to detect flywheel positions. For example, a magnetic sensor may be used and an appropriate magnetic structure may be arranged on a flywheel, so that a position of the flywheel may be determined on the basis of different magnetic forces generated when the flywheel rotates. Those of ordinary skill in the art may, based on actual conditions and needs, determine a sensor to be used, and so no similar descriptions will be provided again.

A projection structure according to the present invention is more compact and small, and applicable in more scenarios; in addition, it can project dynamic images stably and clearly.

A method for controlling projection according to the present invention is provided, wherein the projection structure as described in any one of the above embodiments is adopted in said method.

Specifically, said method comprises step S1. In step S1, said control portion 6 controls said motor 5 and said light source 4 such that said motor 5 is in a stop state when said light source 4 emits a light beam.

Specifically, the control portion 6 controls the number of steps per rotation of said motor 5, and the time interval between rotations; in addition, the control portion 6 controls emission of a light beam by said light source 4 within said time interval.

Figure 10:
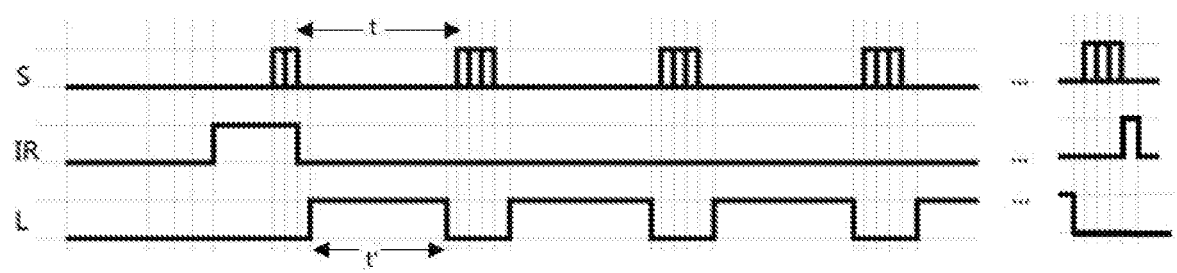
FIG. 10 shows a pulse schematic diagram for an embodiment according to the present invention.

For an embodiment according to the present invention, see FIG. 10; FIG. 10 shows a pulse schematic diagram for an embodiment according to the present invention. In this embodiment, a flywheel loaded with a film is provided with a small recess for marking a start position; in addition, the infrared sensor 601 detects said start position; a distance of three steps is currently set between films.

In the figure, S indicates a control pulse corresponding to a step motor; IR indicates a pulse corresponding to an infrared sensor; and L indicates a control pulse corresponding to a light source.

In the solution according to this embodiment, during the starting phase, when the infrared sensor detects the start position on the flywheel, a rising edge signal is generated and, when said start position has moved, a falling edge signal is generated.

Upon receiving said rising edge signal, the control portion 6 calibrates the motor position. For example, as indicated by control pulse S in the figure, two high pulses are sent to the motor so that it is reset to the start position.

Those of ordinary skill in the art may understand that a calibrating operation may be performed in other modes, for example, by sending a plurality of high pulses, or, when the motor is already in an appropriate position, by sending no high pulses.

Then, after the control portion 6 receives said falling edge signal, a low pulse is outputted to the motor so that the motor stops rotating, and another control pulse L is sent to the light source so that it emits a light beam; based on the control pulse S, at a time interval of t, three high pulses are sent to the step motor; in other words, at a time interval of t, the step motor rotates by a distance of three steps, thereby switching from the position of the current film hole to the next film hole; accordingly, based on the control pulse L, the high pulse of the light source is maintained for a time length of t'; then, before outputting a high pulse, the control pulse S switches to outputting a low pulse to the light source and, after outputting a low pulse, the control pulse S switches back to outputting a high pulse to the light source. Thus, accordingly, when the motor stops, the light source is turned on to project the current film; then, when the motor rotates, the light source is turned off to prevent obscuration of a projected image due to rotation; in addition, when the motor drives the flywheel to rotate to the next film hole and stop, the light source is turned on again to project the film corresponding to the next film hole. This process is repeated until the infrared sensor detects again a start position of the flywheel and then calibration of the start position is performed.

Those of ordinary skill in the art may easily understand that t', namely, the length of time during which the light source remains on may be slightly shorter than t, namely, the time interval of motor rotation stopping; in other words, t' does not start until a short time after t has started, and/or t does not end until a short time after t' has ended; thus, the light source is turned on when the motor has completely stopped rotating, and/or the light source is turned off before the motor starts.

In a preferred embodiment of the present invention, a method according to the present invention further comprises: regulating, by the control portion 6, the rotation cycle of said motor 5 based on a travelling speed of the vehicle on which said projection structure is mounted.

For example, the control portion 6, upon detecting an increase in the traveling speed, shortens the rotation cycle of said motor 5 to correspondingly accelerate the animated motions obtained by projection.

In another preferred embodiment of the present invention, a method according to the present invention further comprises: triggering, by the control portion 6, operation of said projection structure when opening of a door of the vehicle corresponding to said projection structure is detected.

For example, with the projection structure installed near a vehicle door, when opening of the vehicle door is detected, an image is projected on the ground in the position of door opening to alert any people near the door.

In a solution according to the present invention, the respective durations of operation of the light source and motor are controlled such that a film is projected only when it is in a stop state; thus, image obscurity due to film rotation is prevented. In addition, the control portion may have a variety of inputs and, based on different inputs, output the corresponding control signals; thus, the projection structure is capable of giving feedback on a variety of circumstances, and is applicable in more scenarios.

It is readily apparent to those of ordinary skill in the art that the present invention is not limited to the details given in the above-described exemplary embodiments, and that the present invention may be implemented in other specific modes without departing from the spirit or basic characteristics of the present invention. Therefore, from any perspective, an embodiment should be deemed to be exemplary and non-limiting, and the scope of the present invention should be defined by the attached claims but not by the above descriptions. Therefore, it is intended that all changes that fall into the definition and scope of equivalent essentials of the claims be included in the present invention. No reference numeral used in the claims should be deemed to be limiting the claim concerned. In addition, the term "comprise" obviously does not exclude any other unit or step, and the singular does not exclude the plural. A plurality of units or devices described in a system claim may also be implemented by one unit or device and by software or hardware. When used to express a name, a term like "first", "second", etc. does not indicate any specific sequence.

The invention claimed is:

1. Projection structure, comprising:
a first support, a lens assembly, a film portion, a light source, a motor, a control portion, and a second support, wherein:
said light source, said film portion, and said lens assembly form a projection light path, said film portion being driven by said motor to rotate;
said lens assembly comprises at least one lens, and said at least one lens is accommodated in said first support;
said control portion being configured to control said motor and/or said light source; and
said second support is totally arranged below the first support and is configured to support said first support, wherein said first support and second support respectively form a first space and a second space for accommodating said film portion, and the first space and the second space are combined to accommodate said film portion.

2. Projection structure according to claim 1, wherein:
said projection structure further comprises a transmission mechanism, wherein said film portion, via said transmission mechanism, is driven by said motor to rotate; and
said second support is configured to support said transmission mechanism and said first support.

3. Projection structure according to claim 1, wherein said first support further comprises an optical channel and an accommodating portion for accommodating said optical channel, said optical channel being configured to collimate a light beam from said light source as a collimated light beam and cause said collimated light beam to penetrate said film portion.

4. Projection structure according to claim 3, wherein said lens assembly comprises at least one rear lens, said at least one rear lens being positioned between said film portion and a projection output port.

5. Projection structure according to claim 1, wherein said lens assembly comprises at least one front lens and at least one rear lens, said front lens being positioned between said light source and said film portion, said at least one rear lens being positioned between said film portion and a projection output port.

6. Projection structure according to claim 1, wherein said first support comprises:
a lower support and an upper support,
wherein said lower support comprises a lower lens groove that corresponds to said lens assembly, said upper support comprises an upper lens groove that corresponds to said lens assembly, and said lower lens groove and upper lens groove may match each other to fix a lens position.

7. Projection structure according to claim 1, wherein a step motor is used as said motor.

8. Projection structure according to claim 7, wherein a stepping angle of said motor corresponds to the number of films used in the film portion.

9. Projection structure according to claim 1, wherein said control portion is configured to receive input information, thereby triggering a corresponding control signal, and to output said control signal to said motor and/or light source.

10. Projection structure according to claim 9, wherein said control portion may obtain at least one of the following pieces of information:
Film position information;
Vehicle speed information; and
Vehicle operation information.

11. Projection structure according to claim 10, wherein said control portion may obtain sensing input information from an infrared sensor, said infrared sensor being configured to detect one or more specific positions on said film portion.

12. Projection structure according to claim 2, wherein said first support further comprises an optical channel and an accommodating portion for accommodating said optical channel, said optical channel being configured to collimate a light beam from said light source as a collimated light beam and cause said collimated light beam to penetrate said film portion.

13. Projection structure according to claim 2, wherein said lens assembly comprises at least one front lens and at least one rear lens, said front lens being positioned between said light source and said film portion, said at least one rear lens being positioned between said film portion and a projection output port.

14. Method for controlling projection, wherein the projection structure according to claim 1 is adopted in said method, said method comprising:
controlling, by said control portion, said motor and said light source such that said motor is in a stop state when said light source emits a light beam.

15. Method according to claim 14, wherein said method further comprises the following step:
calibrating a position of said motor based on a detected start position of said film portion.

16. Method according to claim 14, wherein said method further comprises the following step:
triggering operation of said projection structure when opening of a door of the vehicle corresponding to said projection structure is detected.

17. Vehicle lamp, comprising the projection structure according to claim 1.

18. Vehicle, comprising the vehicle lamp according to claim 17.

19. Method for controlling projection using a projection structure comprising a first support, a lens assembly, a film portion, a light source, a motor, a control portion, and a second support, wherein said light source, said film portion, and said lens assembly form a projection light path, said film portion being driven by said motor to rotate; said lens assembly comprises at least one lens, and said at least one lens is accommodated in said first support, said control portion being configured to control said motor and/or said light source; said second support is configured to support said first support, wherein said first support and second support respectively form a first space and a second space for accommodating said film portion said method comprising:
- controlling, by said control portion, said motor and said light source such that said motor is in a stop state when said light source emits a light beam;
- controlling the number of rotations of said motor within one cycle, the number of steps per rotation, and the time interval between two rotations; and
- keeping said light source lit within said time interval and turning off said light source before said motor rotates.

20. Method for controlling projection using a projection structure comprising a first support, a lens assembly, a film portion, a light source, a motor, a control portion, and a second support, wherein said light source, said film portion, and said lens assembly form a projection light path, said film portion being driven by said motor to rotate; said lens assembly comprises at least one lens, and said at least one lens is accommodated in said first support, said control portion being configured to control said motor and/or said light source; said second support is configured to support said first support, wherein said first support and second support respectively form a first space and a second space for accommodating said film portion said method comprising:
- controlling, by said control portion, said motor and said light source such that said motor is in a stop state when said light source emits a light beam; and
- regulating the rotation cycle of said motor based on a travelling speed of the vehicle on which said projection structure is mounted.

* * * * *